US008320925B1

(12) United States Patent
Ross et al.

(10) Patent No.: US 8,320,925 B1
(45) Date of Patent: *Nov. 27, 2012

(54) SYSTEMS AND METHODS FOR WIRELESS COMMUNICATIONS WITH A HEAVILY-LOADED WIRELESS NETWORK

(75) Inventors: Richard G. Ross, Lee's Summit, MO (US); Bryan Barbee, Olathe, KS (US); Bob Pippert, Lenexa, KS (US); Samuel M. Woleben, Lenexa, KS (US)

(73) Assignee: Nextel Communications, Inc., Reston, VA (US)

( * ) Notice: Subject to any disclaimer, the term of this patent is extended or adjusted under 35 U.S.C. 154(b) by 22 days.

This patent is subject to a terminal disclaimer.

(21) Appl. No.: 12/898,303

(22) Filed: Oct. 5, 2010

Related U.S. Application Data

(62) Division of application No. 11/703,230, filed on Feb. 7, 2007, now Pat. No. 7,844,278.

(51) Int. Cl.
*H04W 72/00* (2009.01)
(52) U.S. Cl. ...................................... 455/450; 455/453
(58) Field of Classification Search ....................... None
See application file for complete search history.

(56) References Cited

U.S. PATENT DOCUMENTS

| 2005/0213555 A1 | 9/2005 | Eyuboglu et al. |
| 2007/0242606 A1 | 10/2007 | Chen |

*Primary Examiner* — Erika A Washington (57) ABSTRACT

Methods and apparatus for congestion mitigation in wireless communication networks are provided. The congestion mitigation can include assignment of a new user class, a mobile station identifier, a mobile station identifier and a reserved traffic channel and/or an alternative access channel in another wireless communication network. These congestion mitigation techniques can be employed for selected mobile stations when an activity on an access channel is above a threshold level.

4 Claims, 8 Drawing Sheets

SYSTEMS AND METHODS FOR WIRELESS COMMUNICATIONS WITH A HEAVILY-LOADED WIRELESS NETWORK

CROSS-REFERENCE TO RELATED APPLICATIONS

This application is a divisional application of U.S. patent application Ser. No. 11/703,230 filed Feb. 7, 2007, now U.S. Pat. No. 7,844,278.

BACKGROUND OF THE INVENTION

In emergency situations, such as man-made and natural disasters, wireless networks are often overloaded, and unable to service all communication requests. Overloading can occur on contention-based access channels used for requesting traffic channel assignments, as well as on traffic channels. This is particularly problematic for emergency personnel, such as police and fire departments who rely upon the ability to communicate with each other to effectively respond to the emergency situation. For this reason many emergency agencies employ private wireless networks that are not accessible by the general public. These private wireless networks are expensive to maintain, and frequently cannot interoperate with each other. For example, a police agency may employ one type of private wireless network that does not allow communication with a fire agency that employs a different type of private wireless network.

Figure 1:
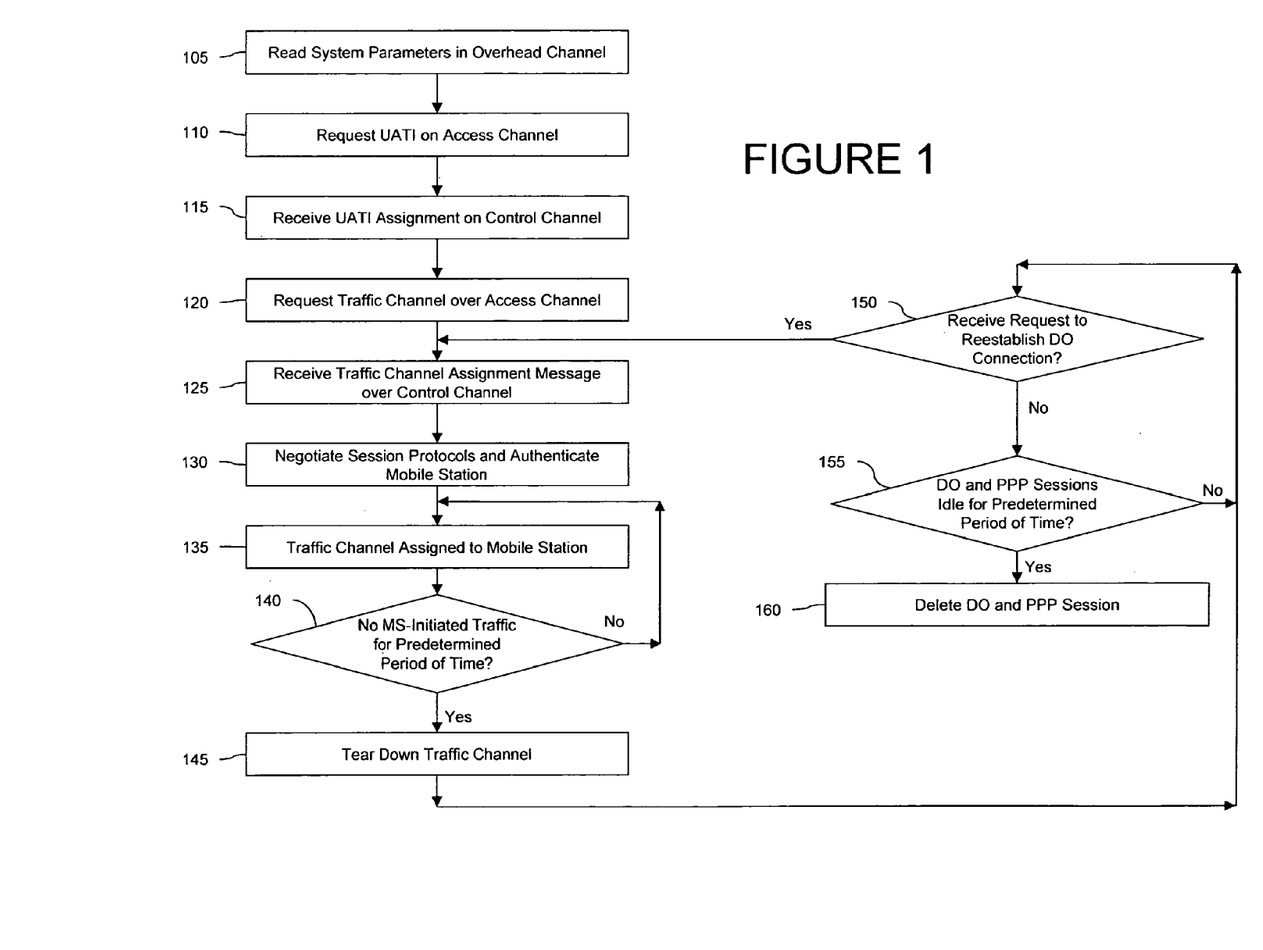
FIG. 1 is a flow diagram of a conventional method of communicating with a wireless network.

FIG. 1 is a flow diagram of a conventional method of communicating with a wireless network. The method of FIG. 1 is described in connection with a CDMA-based network known as Evolution Data-Only (EV-DO) Revision A, (also referred to as a DOrA network). Like all wireless networks, DOrA networks encounter problems with access channel congestion and traffic channel congestion.

A mobile station monitors an overhead or control channel and reads system parameters broadcast over this channel (step 105). When the mobile station desires the ability to transmit information to the wireless network, the mobile station requests a universal access terminal identifier (UATI) (step 110). This request is sent over a contention-based access channel, and when more than one mobile station transmits a request at any particular time on this channel the requests can collide such that neither request is received by the network.

Under normal operating conditions the mobile station then receives a UATI assignment on a control channel (step 115) and transmits a request for a traffic channel over the access channel (step 120). When there are available traffic channels, then the mobile station receives a traffic channel assignment message over a control channel (step 125). The traffic channel assignment sent from the network includes a medium access control identifier (MAC ID). MAC ID's are only valid for the time that the traffic channel assignment is in effect, and the DOrA system can support 114 MAC IDs at a time with each sector and carrier. If more than 114 mobile stations are requesting connections in any particular sector and carrier, then the system will have to either reject the request or close another users connection. The assigned traffic channel is dedicated to the requesting mobile station.

The mobile station then negotiates session protocols with the wireless network, which also authenticates the mobile station (step 130). The session protocols are basically configurations that will be used when exchanging user data. The system authentication (e.g., using the AN-AAA and CHAP challenge and response) verifies that the user device has a legitimate subscription with the service provider. When this EVDO session is completely established, the user (via applications on the mobile station) can proceed to setup a PPP session (including user authentication) with the PDSN and activate various data applications (which could include voice services).

After the mobile station has been authenticated, a traffic channel is assigned to the mobile station (step 135). As long as the mobile station continues to transmit some information over the assigned traffic channel during a predetermined period of time ("No" path out of decision step 140), then the wireless network will maintain the traffic channel assignment with the mobile station (step 135).

When the mobile station does not send any information over the assigned traffic channel for a predetermined period of time ("Yes" path out of decision step 140), then the wireless network tears down the traffic channel and de-assigns the MAC ID (step 145), which can then be reassigned. Even though the DO connection has been torn down, the DO and PPP sessions remain open for a long time (the default session timer for a DO session is set to 54 hours.) Accordingly, the wireless network determines whether it has received a request to establish a DO connection from the mobile station (step 150). When the wireless network receives such a request ("Yes" path out of decision step 150), then the mobile station receives a traffic channel over a control channel (step 125). This technique is commonly referred to as the "fast connection method" because a mobile station maintains UATI, DO session and PPP session assignments. With the DO session still open, if the mobile station wants to send more data, it must first request another DO connection, which it must do via the common access channel. In this case however, the message on the access channel will be 'signed' and the system can easily validate the device/user without detailed authentication.

When the wireless network does not receive a request to reestablish a DO session or an associated PPP session after a predetermined amount of time ("No" path out of decision step 150 and "Yes" path out of decision step 155), then the wireless network deletes the DO and PPP sessions for the mobile station (step 160). For ease of explanation, FIG. 1 illustrates a single period of time being employed in step 155 for determining whether to delete the DO and PPP sessions. However, those skilled in the art will recognize that different periods of time can be employed for deleting DO and PPP sessions.

In EV-DO systems, there is a limited amount of forward and reverse traffic channel capacity to be shared among users. The design of the forward link traffic channels is such that users in better RF signal conditions can be served at a higher data rate than users with poor RF signal conditions. This can be leveraged to maximize the total amount of data that can be sent through the sector. However, it is also desirable to serve all users, not only those in good coverage conditions. Therefore, a scheduling algorithm is employed which attempts to balance these needs. All data is treated in a 'best effort' manner, with no assurance of reliability, particular data rate etc. Further, in DOrA there is no mechanism to reserve any of resources for particular users' exclusive use.

Enhancements have been made in DOrA to distinguish traffic types, and to reserve resources to serve some traffic types over others. This is called intra-user QoS, and prioritizes some types of traffic (or 'flows') over others for each user. Additionally, mechanisms can be employed to prioritize one user's data over another user's data (i.e., inter-user QoS). When a user requests and is authorized to use a particular type of data traffic, the system reserves resources to support that traffic. The system manages its total resource allocations and will refuse to grant more resources when it has no more available to grant.

SUMMARY OF THE INVENTION

Since the access channel is a contention-based channel that is used by all mobile stations, collisions can occur when more than one mobile station transmits over this channel at the same time. Although there are mechanisms in place to randomize access attempt timing, extreme 'event' type conditions (e.g. a 9/11 type event, or possibly a data event storm triggered by a computer virus) can occur in which so many users attempt to access the system at the same time that there is too much interference and the system is unable to decode individual mobile station requests on the access channel. In this condition, the system is unable receive requests for system resources and hence is unable to grant system resources to mobile stations even if sufficient resources exist. The only traffic that can be served then is with those mobile stations that already had an active DO connection (already reserved traffic channel allocations). If those users then stop using the system longer than the inactivity timer, they will loose their DO connection, and they would be in the situation as the other users attempting to transmit on the access channel to request further resources.

Exemplary embodiments of the present invention address the above-identified and other deficiencies of conventional wireless networks. Specifically, exemplary embodiments of the present invention provide methods and apparatus for congestion mitigation techniques in wireless networks. These congestion mitigation techniques can include assignment of a new user class, a mobile station identifier, a mobile station identifier and a reserved traffic channel, and/or an alternative access channel in another wireless communication network. These congestion mitigation techniques can be implemented when the wireless network determines that the activity on an access channel is above a predetermined threshold. When the activity is above the threshold, one or more mobile stations are selected, and then one or more congestion mitigation techniques are employed for the selected mobile stations.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 2A:
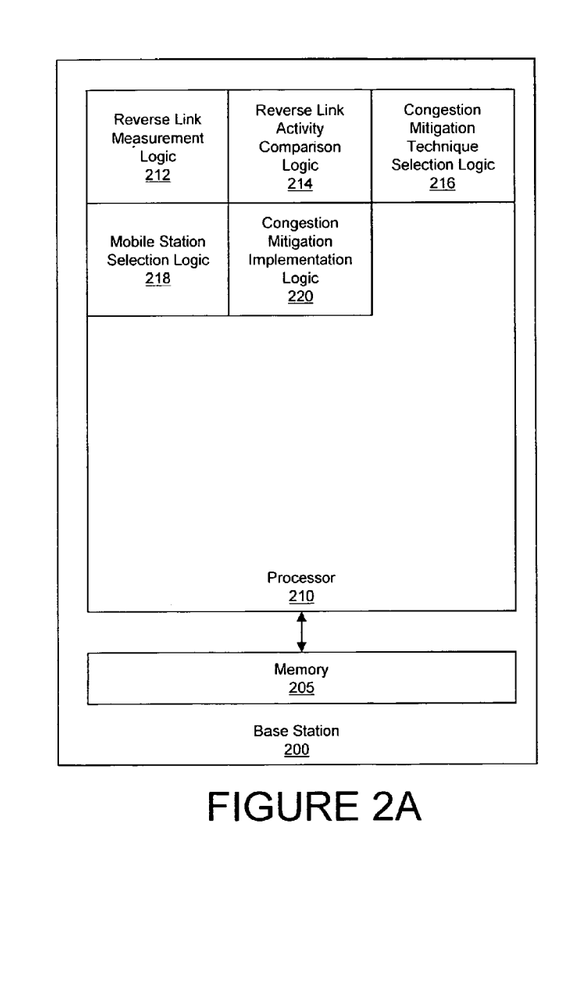
FIGS. 2A and 2B are block diagrams of an exemplary base station and mobile station in accordance with the present invention.
Figure 2B:
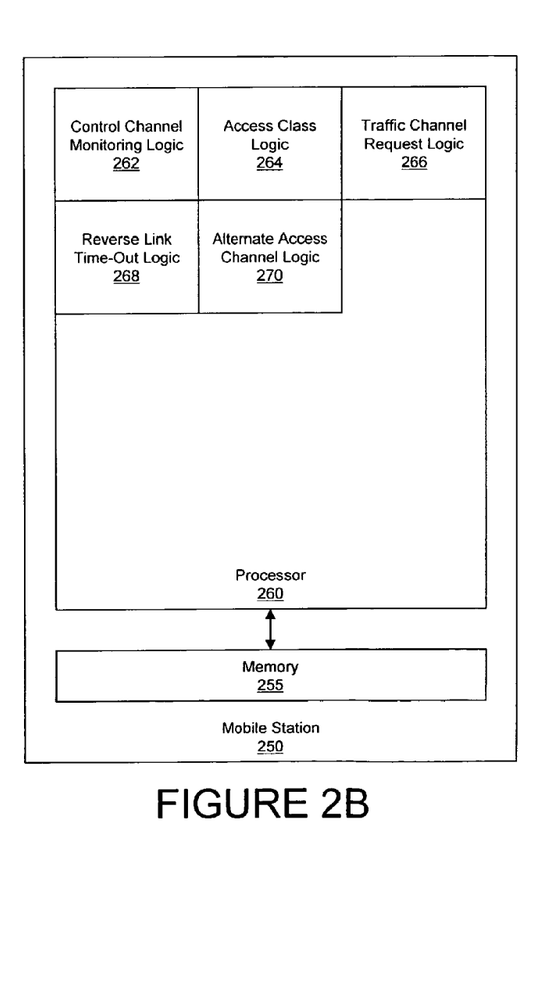

FIGS. 2A and 2B are block diagrams of an exemplary base station and mobile station in accordance with the present invention. In accordance with exemplary embodiments of the present invention, base station 200 includes a memory 205 and processor 210. Memory 205 can be any type of memory. Processor 210 includes logic 212-220, which will be described in more detail below in connection with FIGS. 3 and 4A-4D. Processor 210 can be any type of processor, including a microprocessor, field programmable gate array (FPGA), application specific integrated circuit (ASIC), and/or the like. When processor 210 is a microprocessor, logic 212-220 can be processor-executable code loaded from memory 205.

Mobile station 250 includes a memory 255 and processor 260. Memory 255 can be any type of memory. Processor 260 includes logic 262-270, which will be described in more detail below in connection with FIGS. 5A-5D. Processor 260 can be any type of processor, including a microprocessor, field programmable gate array (FPGA), application specific integrated circuit (ASIC), and/or the like. When processor 260 is a microprocessor, logic 262-270 can be processor-executable code loaded from memory 255. It will be recognized that the block diagrams of FIGS. 2A and 2B illustrate only some of the components of the base station and mobile station, and those skilled in the art will recognize that the base station and mobile station can include additional components, such as, an antenna, amplifiers, D/A converters, and/or the like.

Figure 3:
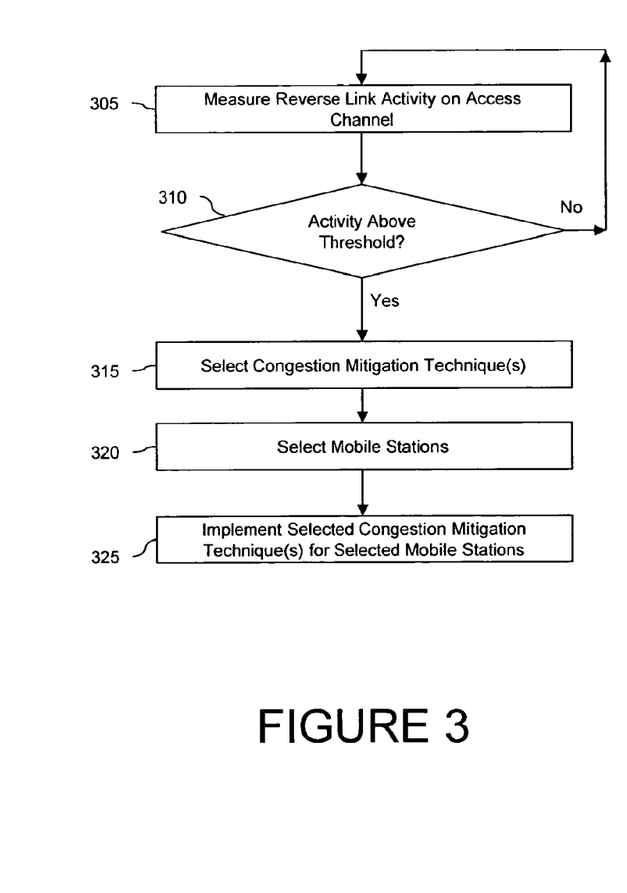
FIG. 3 is a flow diagram of an exemplary method in accordance with the present invention.

FIG. 3 is a flow diagram of an exemplary method in accordance with the present invention. Initially, logic 212 of base station 200 measures the reverse link activity on the access channel (step 305). Logic 214 then determines whether the activity is above a threshold (step 310). When the activity is not above a threshold ("No" path out of decision step 310), then logic 212 continues to measure the reverse link activity (step 305).

When logic 212 determines that the activity on the reverse link is above a threshold ("Yes" path out of decision step 310), then logic 216 selects a congestion mitigation technique (step 315), logic 218 selects mobile stations for implementing the technique (step 320) and logic 220 then implements the selected congestion mitigation technique for the selected mobile stations (step 325). The selected mobile stations can be those used by emergency personnel and/or those used by subscribers that pay higher subscription fees for preferred access.

FIGS. 4A-4D are flow diagrams of exemplary methods for implementing one of a plurality of congestion mitigation techniques in accordance with the present invention. The method of FIG. 4A relates to congestion mitigation by reassignment of user classes. Accordingly, processor 210 determines the existing user classes of the selected mobile stations (step 405). Processor 210 then assigns new user classes to the selected mobile stations (step 410) and broadcasts the new user classes to the selected mobile stations (step 415).

Figure 4A:
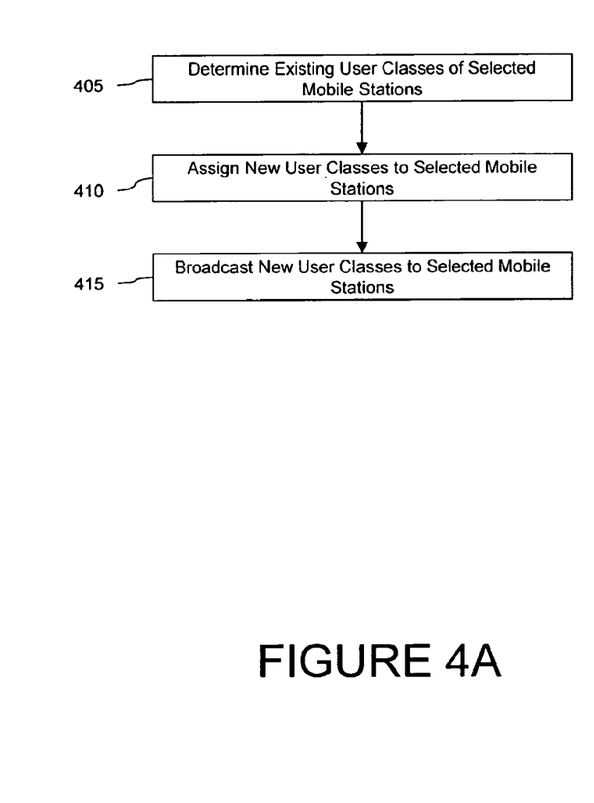
FIGS. 4A-4D are flow diagrams of exemplary methods for implementing one of a plurality of congestion mitigation techniques in accordance with the present invention.
Figure 4B:
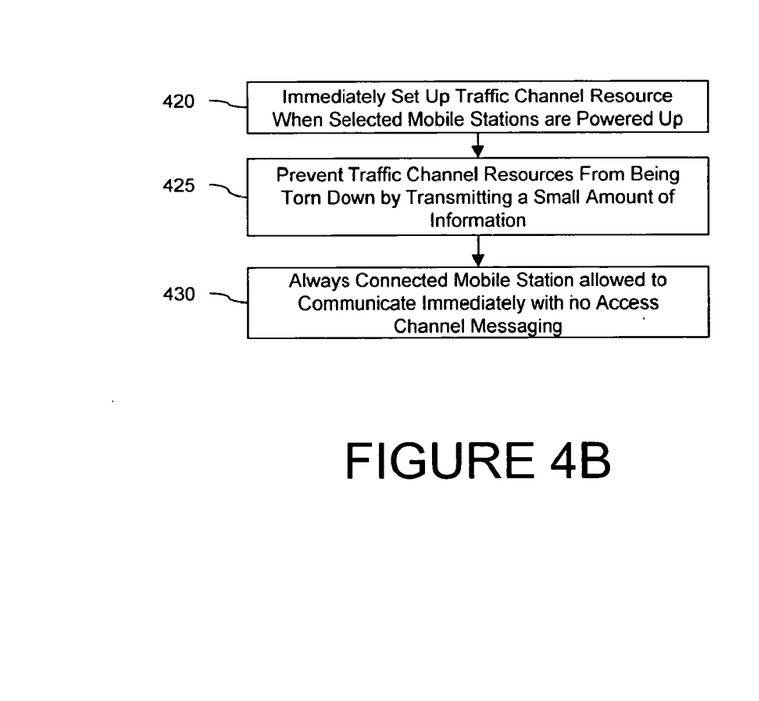

FIG. 4B illustrates an exemplary congestion mitigation technique that involves traffic channel reservation in accordance with the present invention. In this congestion mitigation technique some mobile stations can be designated as "always connected" mobile stations. These mobile stations will maintain a traffic channel, regardless of whether information is to be transmitted by the mobile station, by sending a small amount of information to the base station to prevent the traffic channel from being torn-down due to inactivity. These mobile stations, therefore, do not need to transmit over the contention-based access channel when requesting a traffic channel assignment. Accordingly, when an always connected mobile station is powered up, traffic channel resources are immediately setup for the mobile station (step 420). The mobile station prevents the traffic channel resources from being torn down by transmitting a small amount of information to the base station (step 425). Because the mobile station is assigned a traffic channel resource when it is powered up, the always connected mobile station can communicate using the traffic channel resource without having to request the traffic channel resource on the access channel (step 430).

Figure 4C:
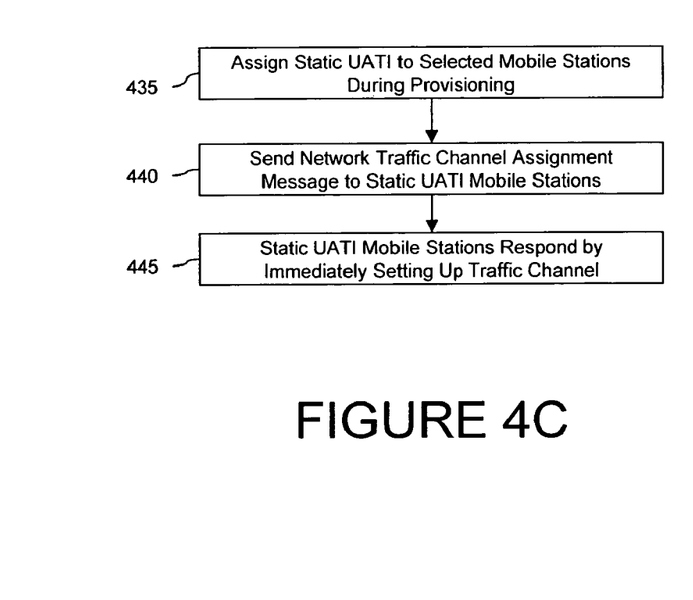

FIG. 4C illustrates an exemplary congestion mitigation technique that involves the use of a static UATI in accordance with the present invention. Accordingly, a static UATI is permanently assigned to a selected mobile station when it is provisioned (step 435). When access congestion is detected or if emergency communication is required, a network initiated traffic channel assignment message is sent to the static UATI mobile stations (step 440). A mobile station with the static UATI can then respond by immediately setting up traffic channel resources (step 445). Accordingly, the mobile station with the static UATI does not need to transmit on the access channel in order to obtain a UATI and traffic channel assignment.

Figure 4D:
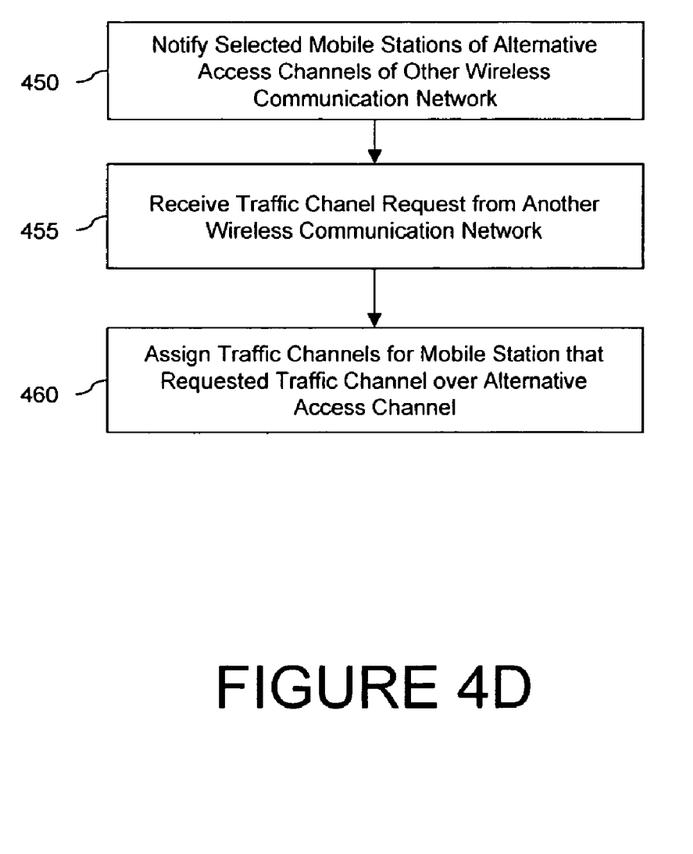
Figure 5A:
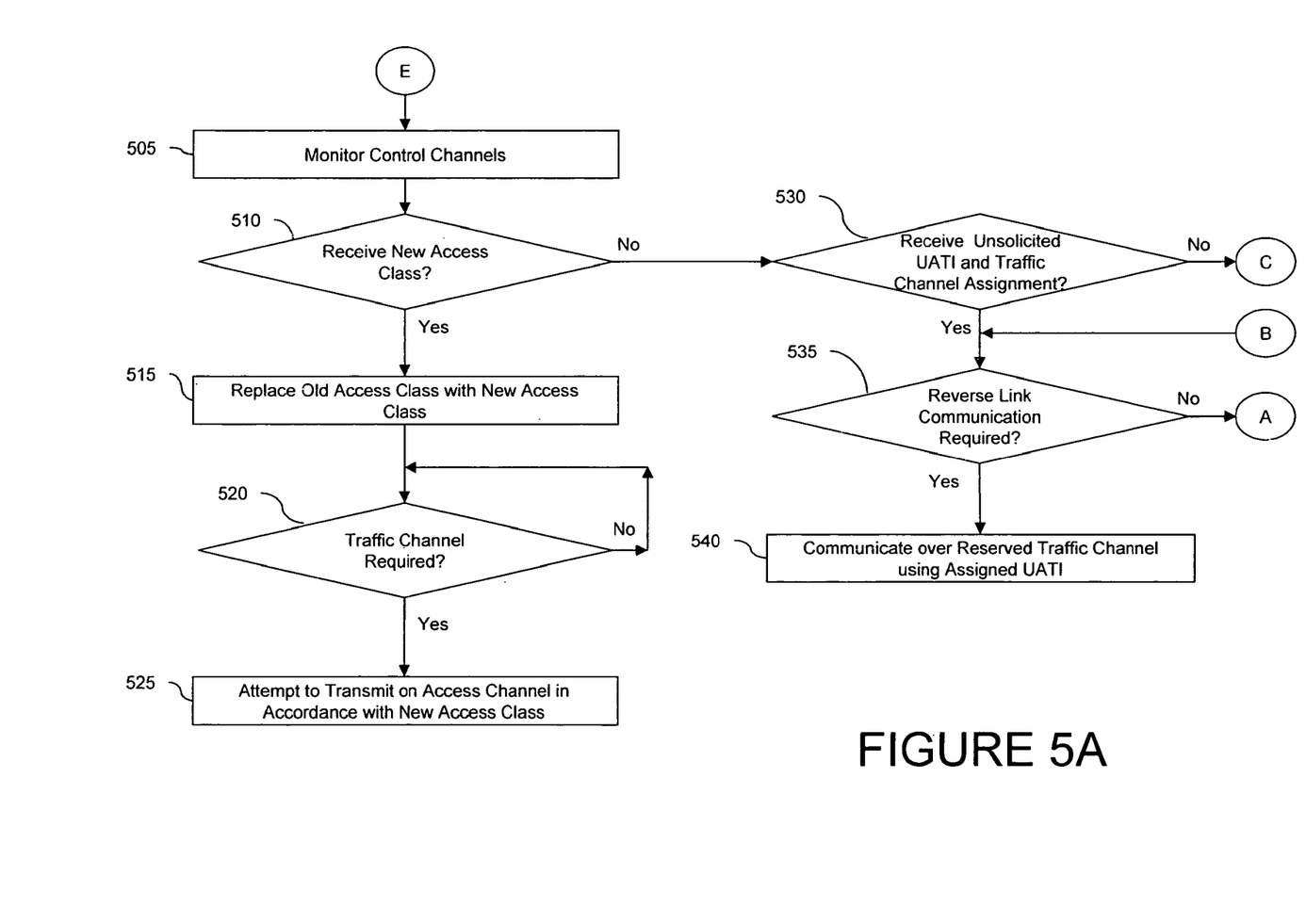
FIGS. 5A-5D are flow diagrams of exemplary methods for mobile stations in accordance with the present invention.
Figure 5B:
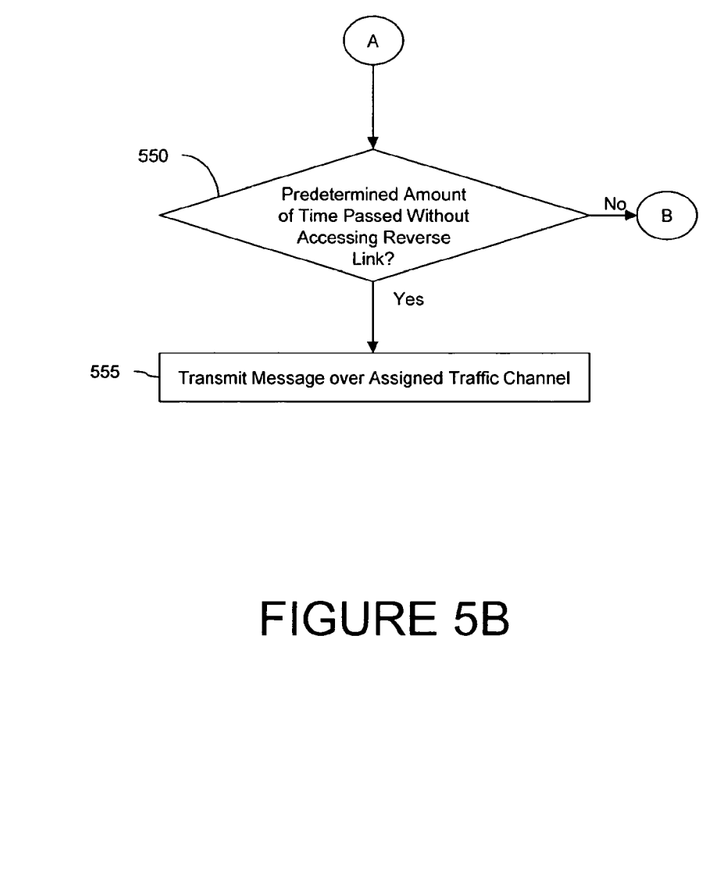
Figure 5C:
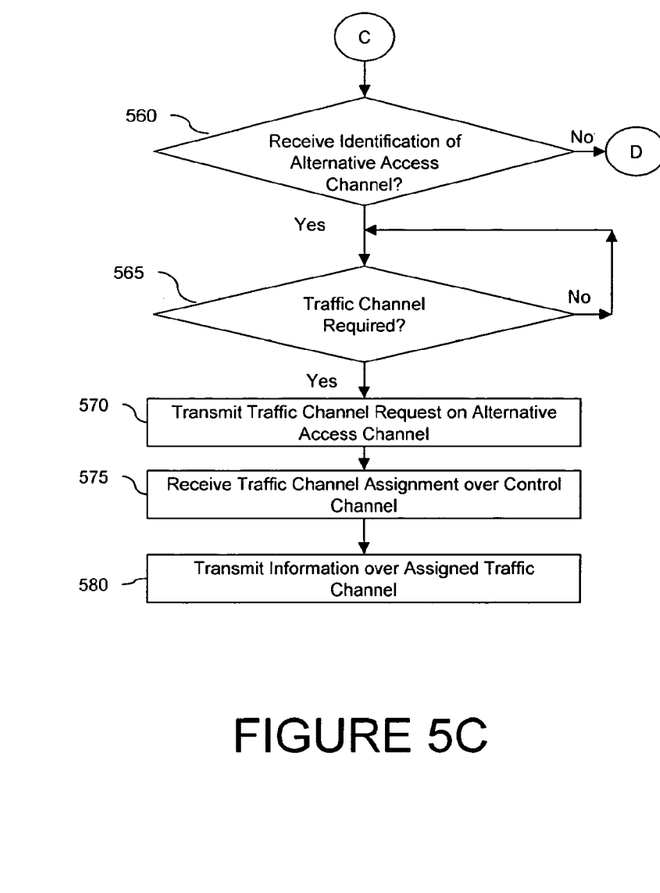
Figure 5D:
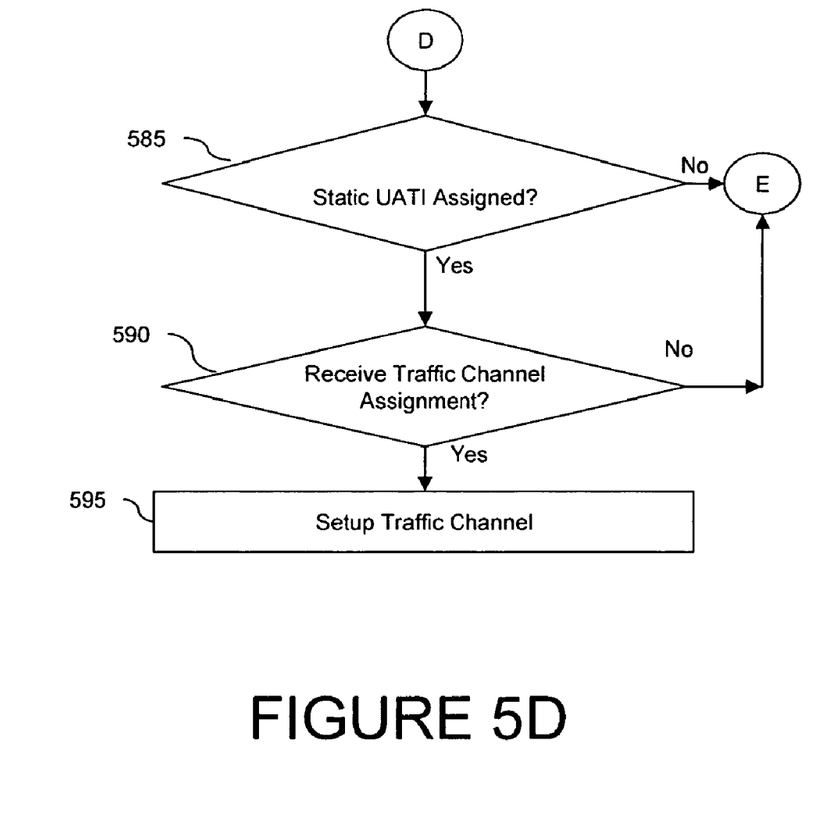

FIG. 4D illustrates an exemplary congestion mitigation technique that involves using access channels of one wireless communication network for sending traffic channel requests to another wireless communication network. These wireless communication networks can employ the same or different air interface modulation, protocols, and/or spectrum. Accordingly, processor 210 notifies the selected mobile stations of alternative access channels of another wireless communication network (step 450). Alternatively, the mobile stations may autonomously recognize the alternative access channel, and the mobile station 250 then sends a request for a traffic channel assignment to base station 200 through the other network. When processor 210 receives the traffic channel request from the other wireless communication network (step 455), then base station 200 assigns a traffic channel to the mobile station that requested the traffic channel (step 460) and transmits the channel assignment to the mobile station on the control channel of base station 200.

FIGS. 5A-5D are flow diagrams of exemplary methods for mobile stations in accordance with the present invention. A mobile station monitors control channels using logic 262 (step 505), and logic 264 determines whether the mobile station has received a message indicating that the mobile station is assigned a new access class (step 510). When a mobile station receives such a message ("Yes" path out of decision step 510), then the mobile station replaces the old access class with the new access class (step 515). When the mobile station requires a traffic channel ("Yes" path out of decision step 520), then logic 266 attempts to transmit over the access channel in accordance with the new access class (step 525).

When the mobile station has not received a new access class assignment ("No" path out of decision step 510), then logic 262 determines whether the mobile station has received an unsolicited UATI and traffic channel assignment (i.e., whether it is an "always connected" mobile station) (step 530). When the mobile station has received an unsolicited UATI and traffic channel assignment ("Yes" path out of decision step 560), then the mobile station determines whether reverse link communication is required (step 535). When reverse link communication is required ("Yes" path out of decision step 535), then the mobile station communicates over the reserved traffic channel using the assigned UATI (step 540).

When the mobile station does not require any reverse link communication ("No" path out of decision step 535), then logic 268 determines whether a predetermined amount of time has passed without the mobile station accessing the reverse link (step 550). When the predetermined amount of time has not passed ("No" path out of decision step 550), then the mobile station determines whether reverse link communication is required (step 535). When the predetermined amount of time has passed ("Yes" path out of decision step 550), then logic 268 causes the mobile station to transmit a message over the assigned traffic channel to prevent the channel from being torn-down. (step 555).

When the mobile station has not received an unsolicited UATI and traffic channel assignment ("No" path out of decision step 530), then logic 270 determines whether the mobile station has received an identification of an alternative access channel in another wireless communication network (step 560). When the mobile station has received such an indication ("Yes" path out of decision step 560), then the mobile station determines whether a traffic channel is required (step 565). When a traffic channel is required ("Yes" path out of decision step 565), then the mobile station transmits a traffic channel allocation request over the alternative access channel (step 570). When the mobile station receives the traffic channel assignment over the control channel (step 575), the mobile station can then begin to transmit information over the assigned traffic channel (step 580). This information includes a request for base station 200 to send a traffic channel assignment to the mobile station to communicate over the original network. In another embodiment, this request could be sent as data over the alternative access channel as a Short Message Service (SMS) message.

When the mobile station has not received an identification of an alternative access channel ("No" path out of decision step 560), then the mobile station determines if it has been assigned a static UATI (step 585). When the mobile station has been assigned a static UATI ("Yes" path out of decision step 585), then logic 262 determines whether it has received a traffic channel assignment (step 590). This will occur when there is access channel congestion or if it is determined that an emergency has occurred. When the mobile station has received a traffic channel assignment ("Yes" path out of decision step 590), then the mobile station sets up a traffic channel (step 595).

It should be recognized that the methods described above in connection with FIG. 3, 4A-4D, and 5A-5D are merely exemplary and not all of the techniques described in connection with these method need to be employed in a network. Moreover, the order of the various steps can be performed in a different order, if desired.

Although exemplary embodiments have been described in connection with DOrA networks, the congestion mitigation techniques can be employed in any type of wireless communication network.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for a mobile station communicating with a first wireless network, the method comprising:
   monitoring a control channel;
   receiving at the mobile station information identifying a second wireless network over the control channel; and
   transmitting to the second wireless network based on the received information a request for a traffic channel of the first wireless network.

2. The method of claim 1, further comprising:
   receiving a traffic channel assignment from the first wireless network, wherein the assigned traffic channel is in the first network; and
   transmitting information in the assigned traffic channel.

3. The method of claim 1, wherein the information identifying the second wireless network is received when an access channel of the first wireless network is congested.

4. The method of claim 1, wherein the traffic channel assignment includes a universal access terminal identifier.

* * * * *